United States Patent
Feher et al.

(10) Patent No.: US 12,354,381 B2
(45) Date of Patent: Jul. 8, 2025

(54) METHOD AND DEVICE FOR DETECTING A LANE FOR A DRIVER ASSISTANCE SYSTEM FOR A VEHICLE WITH A VEHICLE CAMERA AND DETECTION SYSTEM FOR A VEHICLE

(71) Applicant: Robert Bosch GmbH, Stuttgart (DE)

(72) Inventors: Gergo Feher, Teglas (HU); Istvan Remenyi, Tata (HU)

(73) Assignee: ROBERT BOSCH GMBH, Stuttgart (DE)

( * ) Notice: Subject to any disclaimer, the term of this patent is extended or adjusted under 35 U.S.C. 154(b) by 6 days.

(21) Appl. No.: 18/358,230

(22) Filed: Jul. 25, 2023

(65) Prior Publication Data

US 2024/0087337 A1 Mar. 14, 2024

(30) Foreign Application Priority Data

Sep. 12, 2022 (DE) ..................... 10 2022 209 499.9

(51) Int. Cl.
*G06V 10/80* (2022.01)
*B60W 50/14* (2020.01)
*G06T 3/02* (2024.01)
*G06V 20/56* (2022.01)

(52) U.S. Cl.
CPC ........... *G06V 20/588* (2022.01); *B60W 50/14* (2013.01); *G06T 3/02* (2024.01); *G06V 10/80* (2022.01); *B60W 2050/146* (2013.01); *B60W 2420/403* (2013.01); *B60W 2556/20* (2020.02)

(58) Field of Classification Search
CPC .... G06V 20/588; G06V 10/44; G06V 10/776; G06V 10/98; G06V 20/58; G06V 10/809; G06V 10/454; G06V 10/56; G06V 20/52; G06V 20/54; G06V 2201/08; G06F 18/25; G06F 18/256; G06F 18/2411; G06T 2207/30256
USPC ....................................................... 348/148
See application file for complete search history.

(56) References Cited

U.S. PATENT DOCUMENTS

2018/0012085 A1* 1/2018 Blayvas ............. G06F 18/2414
2018/0373941 A1* 12/2018 Kwant ................ G08G 1/0145
2019/0384304 A1* 12/2019 Towal ....................... G06T 7/60

* cited by examiner

*Primary Examiner* — Masum Billah
(74) *Attorney, Agent, or Firm* — NORTON ROSE FULBRIGHT US LLP

(57) ABSTRACT

A method for detecting a lane for a driver assistance system. The method includes an arranging step in which a grid is arranged over a camera image from a vehicle camera, the camera image displaying a roadway. In a displaying step, a lane candidate is displayed using at least one parameter and/or a confidence value for the lane candidate when the at least one lane candidate is detected in at least one cell of the grid. In a filtering-out step, the lane candidate is filtered out when the confidence value of the lane candidate is below a defined confidence threshold. In a back-transforming step, the lane candidate is transformed back to a fixed number of keypoints per lane candidate when the confidence value of the lane candidate is above the confidence threshold, to obtain the lane. In a determining step, 3D coordinates for the lane are determined using the keypoints.

14 Claims, 4 Drawing Sheets

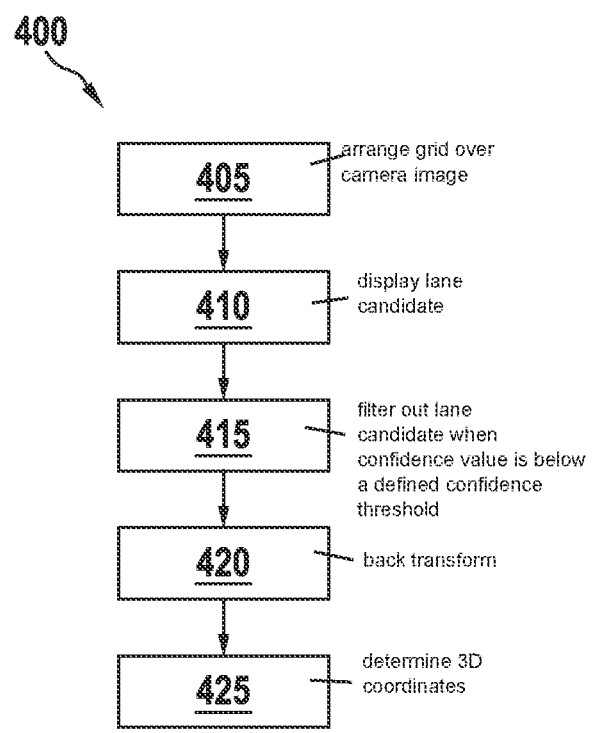

METHOD AND DEVICE FOR DETECTING A LANE FOR A DRIVER ASSISTANCE SYSTEM FOR A VEHICLE WITH A VEHICLE CAMERA AND DETECTION SYSTEM FOR A VEHICLE

CROSS REFERENCE

The present application claims the benefit under 35 U.S.C. § 119 of German Patent Application No. DE 10 2022 209 499.9 filed on Sep. 12, 2022, which is expressly incorporated herein by reference in its entirety.

FIELD

The present invention related to a device or a method for detected a lane for a driver assistance system. The present invention also related to a computer program.

Driver assistance systems use lane detection for a lane assistant, for example.

SUMMARY

The present invention provides a method for detecting a lane for a driver assistance system for a vehicle with a vehicle camera, and also a device that uses this method, a corresponding computer program, and a detection system for a vehicle. Advantageous embodiments, developments and improvements of the method disclosed herein are made possible by the measures disclosed herein.

The advantages that can be achieved with the approach presented include in the fact that tightly curved lanes, as often occur at freeway entries and exits, as well as in traffic circles, can be detected and situations with merging and dividing lanes can also be detected.

A method for detecting a lane for a driver assistance system for a vehicle with a vehicle camera is presented. According to an example embodiment of the present invention, the method comprises an arranging step, a displaying step, a filtering-out step, a back-transforming step, and a determining step. In the arranging step, a grid is arranged over a camera image from the vehicle camera, the camera image displaying a roadway. In the displaying step, a lane candidate is displayed by means of at least one parameter and/or a confidence value for the lane candidate when the at least one lane candidate is detected in at least one cell of the grid. In the filtering-out step, the lane candidate is filtered out when the confidence value of the lane candidate is below a defined confidence threshold. In the back-transforming step, the lane candidate is transformed back to a fixed number of keypoints per lane candidate when the confidence value of the lane candidate is above the confidence threshold, in order to obtain the lane. In the determining step, 3D coordinates for the lane are determined using the keypoints.

In the arranging step, a low-resolution virtual grid can be arranged over the camera image as the grid. The confidence value can predict whether or not the cell actually contains a lane. In the displaying step, for example, a fixed number of lane candidates can be sought in each cell of the grid and displayed when found. In the filtering-out step, the lane candidate can be filtered out by non-maximum suppression if the confidence value of the lane candidate is below the defined confidence threshold, in order to reduce multiple detection of the same lane. Filtered-out lane candidates can then be disregarded for the rest of the method. In the determining step, the 3D coordinates for the lane can be determined using the keypoints and also intrinsic parameters of the vehicle camera and/or the camera position of the vehicle camera relative to the roadway, for example assuming a known road model.

According to an example embodiment of the present invention, the method can be carried out using a neural network. The neural network can be a so-called "convolutional neural network," "CNN" for short. The neural network can, for example, have a selected feature extractor in order to detect lane candidates. Such a neural network can be used to detect lane candidates in the camera image quickly and simply.

In the displaying step, the lane candidate can be displayed as a dashed, continuous or framed lane candidate. Further features of the lane candidate can be displayed, for example visualized, in this way.

According to one example embodiment of the present invention, in the back-transforming step, additional lane points can be interpolated on the basis of the keypoints in order to obtain a finer resolution. For example, in the back-transforming step, the additional lane points can be interpolated on the basis of the derived keypoints using a spline interpolation.

According to an example embodiment of the present invention, in the displaying step, the lane candidate can be displayed by means of the parameter which represents a number of points at certain heights and/or an affine transformation which consists of a scaling, a rotation and/or a translation. The number of points and their vertical distribution can be defined on the basis of the required accuracy and the maximum curvature of a lane. In the displaying step, the lane candidate can be displayed by means of an arbitrary or defined number of points, which can also be referred to as keypoints or lane points. In the displaying step, the lane candidate can be displayed by means of the number of points, which can be arranged at certain heights, for example in the interval [−0.5, 0.5]. A tightly curved lane candidate can advantageously be displayed by means of such parameters.

This method can be implemented, for example, in software or hardware or in a mixed form of software and hardware, for example in a control device.

The present invention presented herein further provides a device which is configured to carry out, actuate or implement the steps of a variant of a method presented here in corresponding apparatuses. The object of the approach can also be achieved quickly and efficiently by this design variant of the approach in the form of a device.

According to an example embodiment of the present invention, for this purpose, the device can have at least one computing unit for processing signals or data, at least one memory unit for storing signals or data, at least one interface to a sensor or an actuator for reading in sensor signals from the sensor or for outputting data signals or control signals to the actuator, and/or at least one communication interface for reading in or outputting data embedded in a communication protocol. The computing unit can, for example, be a signal processor, a microcontroller or the like, wherein the memory unit can be a flash memory, an EEPROM, or a magnetic memory unit. The communication interface can be designed to read in or output data in a wireless and/or wired manner, a communication interface, which can read in or output line-bound data, being able to read in these data, for example electrically or optically, from a corresponding data transmission line, or being able to output these data into a corresponding data transmission line.

In the present case, a device can be understood to be an electrical device that processes sensor signals and, on the basis of these signals, outputs control signals and/or data signals. The device can have an interface that can be designed as hardware and/or software. In a hardware embodiment, the interfaces can, for example, be part of a so-called system ASIC, which contains a wide variety of functions of the device. However, it is also possible for the interfaces to be separate integrated circuits or at least partially consist of discrete components. In the event of a software embodiment being used, the interfaces can be software modules that are present, for example, on a microcontroller in addition to other software modules.

A computer program product or a computer program with program code that can be stored on a machine-readable carrier or storage medium, such as a semiconductor memory, a hard disk memory, or an optical memory, and that is used for carrying out, implementing, and/or actuating the steps of the method according to one of the embodiments described above is also advantageous, in particular when the program product or program is executed on a computer or a device.

According to an example embodiment of the present invention, a detection system for a vehicle has the above-described device and a vehicle camera for providing the camera image. Such a detection system can be used as a comprehensive system for the automated detection of lanes, wherein, by means of the device, even tightly curved lanes, for example merging and dividing lanes, can be detected. The detection system can be part of a driver assistance system for the vehicle.

Embodiments of the present invention presented here are illustrated in the figures and explained in more detail in the following description.

BRIEF DESCRIPTION OF THE DRAWINGS

FIG. 4 is a flow chart of a method according to one example embodiment of the present invention for detecting a lane for a driver assistance system for a vehicle with a vehicle camera.

DETAILED DESCRIPTION OF EXAMPLE EMBODIMENTS

In the following description of advantageous embodiments of the present invention, the same or similar reference signs are used for the elements shown in the various figures and acting similarly, as a result of which a repeated description of these elements is omitted.

Figure 1:
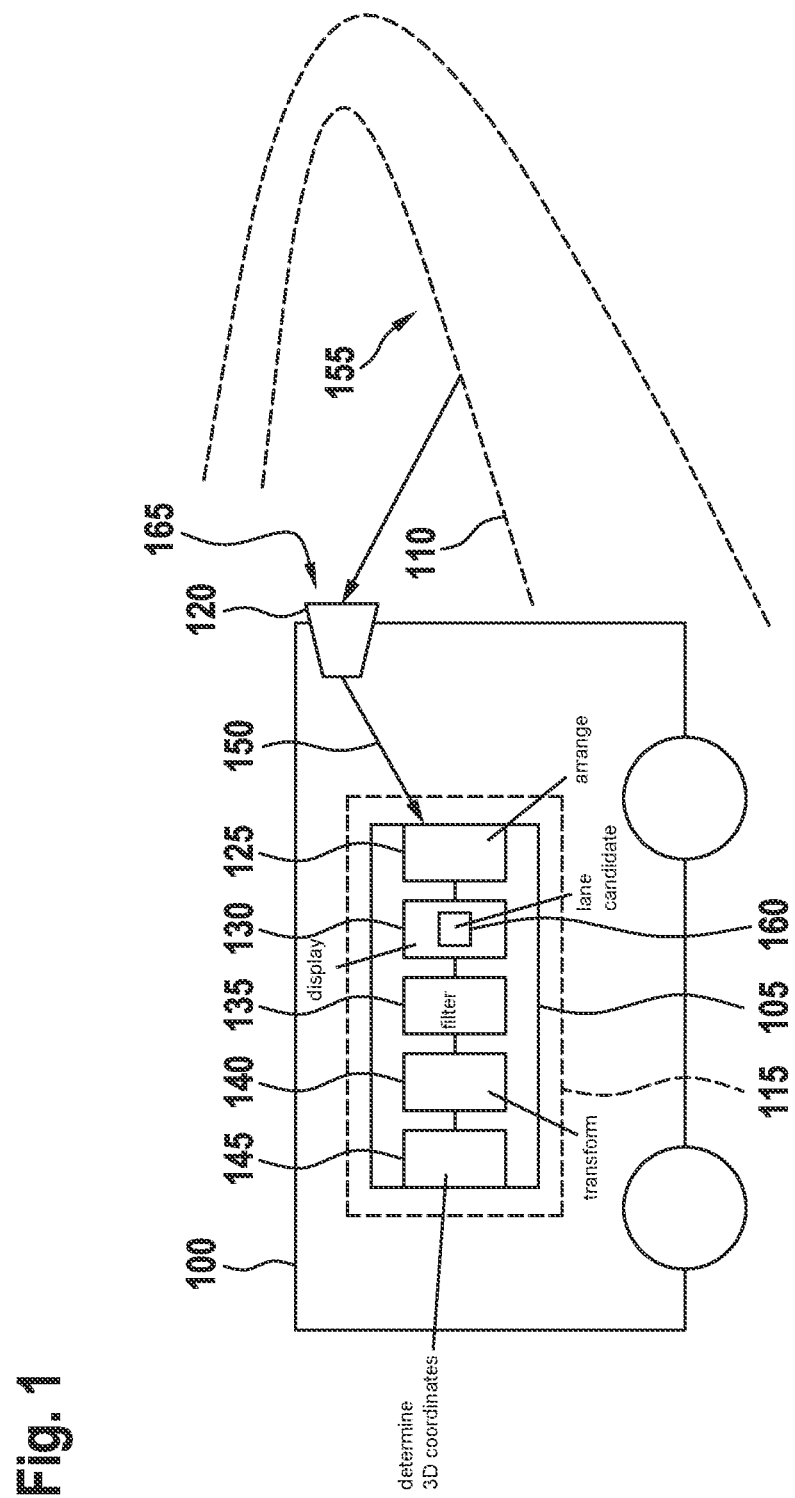
FIG. 1 is a schematic representation of a vehicle with a device for detecting a lane for a driver assistance system of the vehicle with a vehicle camera, according to an example embodiment of the present invention.

FIG. 1 is a schematic representation of a vehicle 100 having a device 105 for detecting a lane 110 for a driver assistance system 115 of the vehicle 100 with a vehicle camera 120.

Only by way of example, the device 105 according to this embodiment is arranged on or in the vehicle 100, for example implemented in the driver assistance system 115 of the vehicle 100. According to this embodiment, the vehicle 100 also has the vehicle camera 120, which is formed here by way of example as an environment monitoring camera directed toward the environment of the vehicle 100.

The device 105 has an arranging means 125, a display means (i.e., a display) 130, a filter means (i.e., a filter) 135, a transforming means (i.e., a transforming arrangement) 140 and a determining means (i.e., a determining arrangement) 145. The arranging means 125 is designed to arrange a grid over a camera image 150 from the vehicle camera 120, the camera image 150 displaying a roadway 155. The display means 130 is designed to display a lane candidate 160 by means of at least one parameter and/or a confidence value for the lane candidate 160 when the at least one lane candidate 160 is detected in at least one cell of the grid. The filter means 135 is designed to filter out the lane candidate 160 when the confidence value of the lane candidate 160 is below a defined confidence threshold. The transforming means 140 is designed to transform the lane candidate 160 back to a fixed number of keypoints per lane candidate when the confidence value of the lane candidate is above the confidence threshold, in order to obtain the lane 110. The determining means 145 is designed to determine 3D coordinates for the lane 110 using the keypoints.

According to this embodiment, the arranging means 125 is designed to arrange a low-resolution virtual grid over the camera image 150 as the grid. According to this embodiment, the confidence value predicts whether or not the cell actually contains a lane. According to one embodiment, the display means 130 is designed to search for a fixed number of lane candidates 160 in each cell of the grid and to display them when found. According to one embodiment, the display means 130 is also designed to detect and/or display the lane candidate 160 as a dashed, continuous or framed lane candidate. According to one embodiment, the filter means 135 is designed to filter out the lane candidate 160 by non-maximum suppression when the confidence value of the lane candidate 160 is below the defined confidence threshold, in order to reduce multiple detection of the same lane. According to one embodiment, filtered-out lane candidates 160 are disregarded by the transforming means 140 and determining means 145. According to one embodiment, the filter means 135 is also designed to interpolate additional lane points on the basis of the keypoints, in order to obtain a finer resolution. For example, using the filter means 135, the additional lane points are interpolated on the basis of the derived keypoints using a spline interpolation.

The determining means 145 is designed to determine the 3D coordinates for the lane 110 using the keypoints and, according to this embodiment, also using intrinsic parameters of the vehicle camera 120 and/or using the camera position of the vehicle camera 120 relative to the roadway 155, for example assuming a known road model.

According to one embodiment, the device 105 is designed to use a neural network. According to one embodiment, the neural network has a selected feature extractor to detect lane candidates 160 in the camera image 150.

Figure 3:
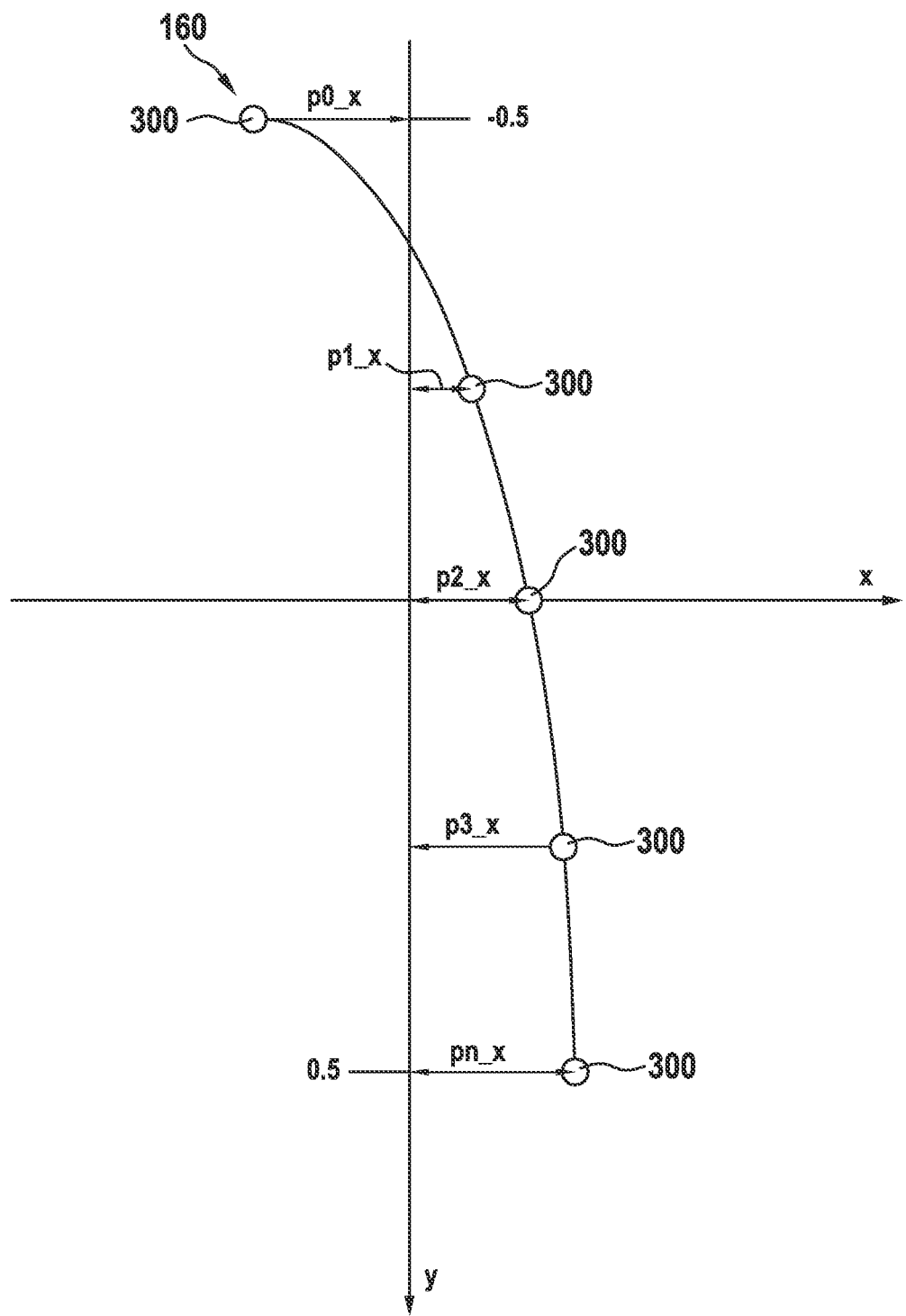
FIG. 3 is a schematic representation of a lane candidate which was displayed using a display means of a device according to one embodiment, according to an example embodiment of the present invention.

According to one embodiment, the display means 130 is designed to display the lane candidate 160 by means of the parameter which represents a number of points at certain heights and/or an affine transformation which consists of a scaling, a rotation and/or a translation; see also FIG. 3.

Together with the vehicle camera 120, the device 105 can also be referred to as a detection system 165 for a vehicle 100. According to this embodiment, the detection system 165 is part of the driver assistance system 115 of the vehicle 100.

In summary, the device 105 presented here enables a lane display for an end-to-end inference.

Most advanced driver assistance systems include the detection of lane boundaries on the road/roadway 155 at some point. Conventional algorithms used for this purpose can be divided into two groups on the basis of the line display used. One of the approaches is based on a semantically segmented low-level image; the lines are then obtained by filtering and clustering the pixels of relevant classes. The other approach uses high-level polynomial displays, the parameters of which are derived by some typically anchor-based algorithms. Most current solutions include the assumption that the points of the lanes are vertically monotonic, in other words that for each point γk+1>γk, where γk denotes the y-coordinate of the kth keypoint of the lane from top to bottom. Although this assumption applies in most cases for freeways, it often fails on urban roads. Many algorithms require additional clustering and complex post-processing steps to provide lane instances and have further assumptions and hard constraints with respect to the number and shape of the lanes that can be displayed.

For this reason, the device 105 presented here enables a lane display which does not require the above-mentioned assumptions and therefore reproduces even tightly curved lanes 110, as often occur at freeway entries and exits, as well as in traffic circles, and also covers situations with merging and dividing lanes. Using the display presented here, see FIG. 3, most conventional end-to-end one-shot object detectors can be easily converted into a lane detector.

Using the lane display described above and in FIG. 3, the detection of lanes 110 according to this embodiment is implemented on an image 150, e.g. in an end-to-end manner. An exemplary function of the device 105 is described below:

According to one embodiment, a convolutional neural network, "CNN" for short, with a selected feature extractor is trained such that a low-resolution grid is placed over the camera image 150 in the form of an input image, and the network proposes a fixed number of lane candidates 160 for each cell of the grid. The lane candidate 160 is then represented by means of the above-mentioned parameters described in more detail in FIG. 3 and a confidence value which predicts whether or not the cell actually contains a lane 110. According to one embodiment, this display is extended by further terms which represent other attributes of the lane 110, e.g. dashed/continuous/framed. According to one embodiment, the lane candidates 160 above the defined confidence threshold are filtered further, for example with the aid of non-maximum suppression, in order to reduce multiple detection of the same lane 110. According to one embodiment, the lanes 110 are then transformed back to a fixed number of keypoints per lane 110, and if a finer resolution is required, additional lane points are interpolated on the basis of the derived keypoints, e.g. with spline interpolation. The 3D coordinates of the roadway points are determined from the keypoints, and optionally also from the intrinsic parameters of the camera 120 and/or the position thereof relative to the road, assuming a known road model.

Since this method for detecting the 2D lanes is based only on the keypoints derived from the lane lines, many extensive public data records can be used for training the lane detector.

With regard to other details of the training of the network, according to one embodiment, a simple multitasking loss is used, which consists of a classification loss, e.g. binary cross-entropy, a focal loss, etc., for the confidence value and mean square errors for the parameters of the lane 110.

The device 105 presented here can be integrated into any perception module and can be used for lane detection for driver assistance systems 115, for example "ADAS", and automated driving systems. For example, the device 105 can be used as described herein in connection with a vehicle camera 120, and thus enables an improved installed lane detection system. The approach presented here can further benefit adaptive cruise control, "ACC" for short, "PACE," i.e. lane detection, or other projects that are dependent on lane information.

Figure 2:
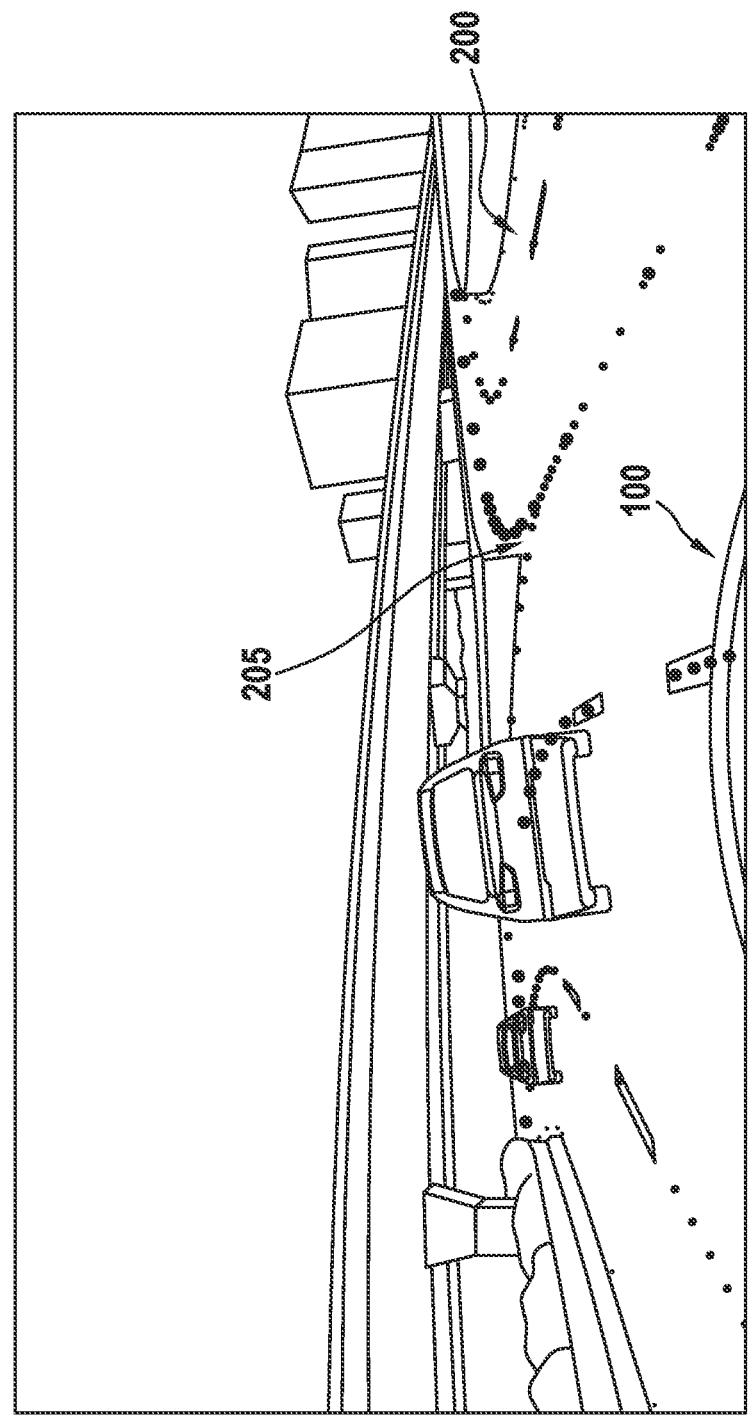
FIG. 2 is a schematic representation of a vehicle having a device according to one embodiment, according to an example embodiment of the present invention.

FIG. 2 is a schematic representation of a vehicle 100 having a device according to one embodiment. This can be the vehicle 100 described in FIG. 1 having the device described in FIG. 1.

Due to the device, even tightly curved lanes, for example entries and exits 200 and lane sections in traffic circles and/or merging and dividing lanes 205, are also detected.

FIG. 3 is a schematic representation of a lane candidate 160, which was displayed using a display means of a device according to one embodiment. This can be the device described in FIG. 1 or 2.

According to this embodiment, the display means is designed to display the lane candidate 160 by means of the parameter which represents a number of points 300 at certain heights and/or an affine transformation which consists of a scaling, a rotation and/or a translation dx, dy. According to one embodiment, the number of points 300, here five points 300 by way of example, and their vertical distribution are defined on the basis of the required accuracy and the maximum curvature of a lane 110.

According to one embodiment, the display means is designed to display the lane candidate 160 by means of an arbitrary or defined number of points 300, which can also be referred to as keypoints or lane points. According to this embodiment, the display means is designed to display the lane candidate 160 by means of the number of points 300, which are arranged at certain heights, for example in the interval [−0.5, 0.5] here.

In other words, FIG. 3 shows the display of a lane. The lane is displayed by N points 300 at certain heights in the interval [−0.5, 0.5] and an affine transformation which consists of a scaling (S), a rotation (a) and a translation (dx, dy).

FIG. 4 is a flow chart of a method 400 according to one embodiment for detecting a lane for a driver assistance system for a vehicle with a vehicle camera. This can be a method 400 which can be carried out or actuated by one of the devices described with reference to the above-described figures.

The method 400 comprises an arranging step 405, a displaying step 410, a filtering-out step 415, a back-transforming step 420 and a determining step 425. In the arranging step 405, a grid is arranged over a camera image from the vehicle camera, the camera image displaying a roadway. In the displaying step 410, a lane candidate is displayed by means of at least one parameter and/or a confidence value for the lane candidate when the at least one lane candidate is detected in at least one cell of the grid. In the filtering-out step 415, the lane candidate is filtered out when the confidence value of the lane candidate is below a defined confidence threshold. In the back-transforming step 420, the lane candidate is transformed back to a fixed number of keypoints per lane candidate when the confidence value of the lane candidate is above the confidence threshold, in order to obtain the lane. In the determining step 425, 3D coordinates for the lane are determined using the keypoints.

What is claimed is:

1. A method for a driver assistance system of for a vehicle with a vehicle camera, the method comprising the following steps:

arranging a grid over a camera image from the vehicle camera, the camera image displaying a roadway;

generating lane candidates using at least one parameter and/or a confidence value for each of the lane candidates respectively when the at least one lane candidate is detected in at least one cell of the grid;

filtering out one or more of the generated lane candidates when the respective confidence value of the respective lane candidate is below a defined confidence threshold;

for each remaining one of the generated lane candidates remaining after the filtering, performing a resolution reduction transforming the respective remaining lane candidate from a continuous lane form into a number of keypoints, the number depending on a degree of curvature of the respective lane candidate; and using the keypoints to determine 3D coordinates, thereby identifying a geometry of a lane traveled by the vehicle.

2. The method according to claim 1, wherein the method is carried out using a neural network.

3. The method according to claim 1, wherein, in the generating step, the respective lane candidates are each represented as a dashed or continuous or framed lane candidate.

4. The method according to claim 1, further comprising interpolating additional lane points based on the keypoints to obtain a finer resolution, the determination of the 3D coordinates being based additionally on the additional lane points.

5. The method according to claim 1, wherein, in the generating step, the respective lane candidates are each represented using a number of points at certain heights.

6. The method according to claim 1, wherein, in the generating step, the respective lane candidates are each represented by an affine transformation including a scaling, and/or a rotation, and/or a translation.

7. The method according to claim 1, wherein the filtering out step includes a non-maximum suppression that reduces a number of lane candidates of a single lane by removing those of the lane candidates of the single lane based on relative confidence levels of the lane candidates of the single lane.

8. The method according to claim 1, further comprising performing a spline interpolation to increase the number of the keypoints.

9. The method according to claim 1, wherein the determination of the 3D coordinates is based on intrinsic parameters of the vehicle camera.

10. The method according to claim 1, wherein the determination of the 3D coordinates is performed using a predefined road model.

11. The method according to claim 1, wherein the determination of the 3D coordinates is based on a position of the vehicle camera relative to the roadway.

12. A device configured to perform a method for a driver assistance system of a vehicle with a vehicle camera, the device comprising a processor system that includes at least one processor, the processor system being programmed to:

arrange a grid over a camera image from the vehicle camera, the camera image displaying a roadway;

generate lane candidates using at least one parameter and/or a confidence value for each of the lane candidates respectively when the at least one lane candidate is detected in at least one cell of the grid;

filter out one or more of the generated lane candidates when the respective confidence value of the respective lane candidate is below a defined confidence threshold;

for each remaining one of the generated lane candidates remaining after the filtering, performing a resolution reduction transform the respective remaining lane candidate from a continuous lane form into a number of keypoints, the number depending on a degree of curvature of the respective lane candidate; and use the keypoints to determine 3D coordinates, thereby identifying a geometry of a lane traveled by the vehicle.

13. A detection system for a vehicle, comprising:

a vehicle camera of the vehicle; and a device configured to perform a method for a driver assistance system of the vehicle, the device comprising a processor system that includes at least one processor, the processor system being programmed to:

arrange a grid over a camera image from the vehicle camera, the camera image displaying a roadway;

generate lane candidates using at least one parameter and/or a confidence value for each of the lane candidates respectively when the at least one lane candidate is detected in at least one cell of the grid;

filter out one or more of the generated lane candidates when the respective confidence value of the respective lane candidate is below a defined confidence threshold;

for each remaining one of the generated lane candidates remaining after the filtering, performing a resolution reduction transform the respective remaining lane candidate from a continuous lane form into a number of keypoints, the number depending on a degree of curvature of the respective lane candidate; and use the keypoints to determine 3D coordinates, thereby identifying a geometry of a lane traveled by the vehicle.

14. A non-transitory machine-readable storage medium on which is stored a computer program that is executable by a computer and that, when executed by the computer, causes the computer to perform a method for a driver assistance system of a vehicle with a vehicle camera, the method comprising the following steps:

arranging a grid over a camera image from the vehicle camera, the camera image displaying a roadway;

generating lane candidates using at least one parameter and/or a confidence value for each of the lane candidates respectively when the at least one lane candidate is detected in at least one cell of the grid;

filtering out one or more of the generated lane candidates when the respective confidence value of the respective lane candidate is below a defined confidence threshold;

for each remaining one of the generated lane candidates remaining after the filtering, performing a resolution reduction transforming the respective remaining lane candidate from a continuous lane form into a number of keypoints, the number depending on a degree of curvature of the respective lane candidate; and using the keypoints to determine 3D coordinates, thereby identifying a geometry of a lane traveled by the vehicle.

* * * * *